(12) United States Patent
Ryou et al.

(10) Patent No.: US 10,497,917 B2
(45) Date of Patent: Dec. 3, 2019

(54) ZINC-AIR SECONDARY BATTERY

(71) Applicant: E.M.W. ENERGY CO., LTD., Seoul (KR)

(72) Inventors: Byoung Hoon Ryou, Seoul (KR); Jae Kyung Kong, Seoul (KR)

(73) Assignee: E.M.W. ENERGY CO., LTD., Seoul (KR)

( * ) Notice: Subject to any disclaimer, the term of this patent is extended or adjusted under 35 U.S.C. 154(b) by 0 days.

(21) Appl. No.: 16/077,609

(22) PCT Filed: Feb. 8, 2017

(86) PCT No.: PCT/KR2017/001363
§ 371 (c)(1),
(2) Date: Aug. 13, 2018

(87) PCT Pub. No.: WO2017/138741
PCT Pub. Date: Aug. 17, 2017

(65) Prior Publication Data
US 2019/0036097 A1 Jan. 31, 2019

(30) Foreign Application Priority Data
Feb. 12, 2016 (KR) .................. 10-2016-0016482

(51) Int. Cl.
*H01M 2/16* (2006.01)
*H01M 12/08* (2006.01)
(Continued)

(52) U.S. Cl.
CPC ........... *H01M 2/18* (2013.01); *H01M 2/1646* (2013.01); *H01M 2/1686* (2013.01);
(Continued)

(58) Field of Classification Search
None
See application file for complete search history.

(56) References Cited

U.S. PATENT DOCUMENTS

| | | | |
|---|---|---|---|
| 5,716,726 A | 2/1998 | Cheiky | |
| 8,288,034 B2 * | 10/2012 | Davis | H01M 2/162 429/144 |

(Continued)

FOREIGN PATENT DOCUMENTS

| KR | 10-2013-0001170 A | 1/2013 |
|---|---|---|
| KR | 10-2013-0014650 A | 2/2013 |

(Continued)

OTHER PUBLICATIONS

Machine translation of KR 20150143289, Dec. 2015.*
International Search Report for PCT/KR2017/001363 dated May 31, 2017.

*Primary Examiner* — Jonathan Crepeau
(74) *Attorney, Agent, or Firm* — The PL Law Group, PLLC

(57) ABSTRACT

A zinc-air secondary battery includes a positive electrode, a negative electrode, a separation membrane interposed between the positive and negative electrodes, and an electrolyte accommodated between the positive and negative electrodes and submerging a part of the positive electrode. The separation membrane is a porous separation membrane having a plurality of through-holes, and the separation membrane is provided with through-holes. The sizes of the holes are smaller than the size of the potassium ions contained in the electrolyte. A plurality of adsorptive potassium ion particles are evenly attached on at least one side of the separation membrane to form an adsorptive potassium ion particle layer.

6 Claims, 1 Drawing Sheet

(51) Int. Cl.
  *H01M 2/18*  (2006.01)
  *H01M 12/06* (2006.01)
(52) U.S. Cl.
  CPC ........... *H01M 12/06* (2013.01); *H01M 12/08* (2013.01); *Y02E 60/128* (2013.01)

(56) References Cited

U.S. PATENT DOCUMENTS

2002/0142203 A1    10/2002  Ma et al.
2017/0005311 A1*    1/2017  Hayakawa ............ H01M 2/162

FOREIGN PATENT DOCUMENTS

KR    10-2013-0112315 A    10/2013
KR    10-2015-0050467 A     5/2015
KR    10-2015-0143289 A    12/2015

* cited by examiner

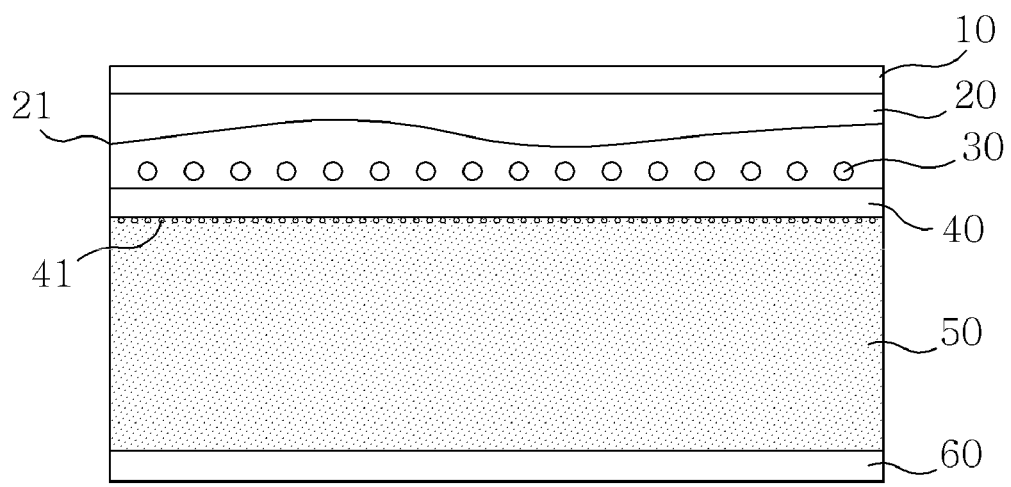

ZINC-AIR SECONDARY BATTERY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/001363, filed Feb. 8, 2017, which claims priority to the benefit of Korean Patent Application No. 10-2016-0016482 filed in the Korean Intellectual Property Office on Feb. 12, 2016, the entire contents of which are incorporated herein by reference.

TECHNICAL FIELD

The present invention relates to a zinc-air secondary battery that is capable of preventing potassium ions from being precipitated from a positive electrode.

BACKGROUND

Generally, a battery is assembled by interposing a separator between a positive electrode and a negative electrode. In this case, the separator placed between both electrodes of the battery is a member that prevents the positive electrode and the negative electrode from being internally shorted due to a direct contact therewith, and is not only an ion path within the battery but also plays an important role in improving safety of the battery.

A zinc-air battery includes a positive electrode, a separator, an electrolyte, and a negative electrode. First, the positive electrode includes a carbon layer, a positive electrode collector having a shape of metal mesh formed in the carbon layer, and a Teflon layer formed at an upper portion of the carbon layer.

Also, the separator is placed at a lower portion of the carbon layer, and a negative electrode collector of the negative electrode is formed while being spaced a predetermined distance apart from the separator.

The electrolyte is formed to have a shape of a slurry in which zinc (Zn), potassium hydroxide (KOH) and water ($H_2O$) are mixed altogether, and is accommodated between the separator and the negative electrode collector. In this case, the electrolyte passes through the separator and submerges a part of the carbon layer, thereby forming a vapor liquid interface.

The zinc-air battery having the above structure operates due to movement of electrons generated when Zn contained in the electrolyte reacts with oxygen in the air and is changed into a zinc oxide.

In the above-described zinc-air battery according to the related art, the electrolyte submerges a part of the carbon layer through a plurality of through-holes of the separator. In this case, potassium hydroxide contained in the electrolyte reacts with oxygen in the air and is precipitated from a reaction structure. Thus, the carbon layer is destroyed, and thus performance of the zinc-air battery is degraded.

In addition, when the zinc-air battery is charged, oxygen is moved to the positive electrode. The oxygen moved to the positive electrode and potassium hydroxide react with each other and are precipitated from a reaction structure, and thus it is difficult to use the zinc-air battery as a secondary battery.

SUMMARY

The present invention is directed to providing a zinc-air secondary battery that is capable of preventing potassium ions contained in an electrolyte from being precipitated from a positive electrode.

One aspect of the present invention provides a zinc-air secondary battery, more specifically, to a zinc-air secondary battery including: a positive electrode; a negative electrode; a separation membrane interposed between the positive and negative electrodes; and an electrolyte accommodated between the positive and negative electrodes and submerging a part of the positive electrode, wherein the separation membrane, which is a porous separation membrane having a plurality of through-holes, is provided with through-holes, the size of which is smaller than the size of the potassium ions contained in the electrolyte, and a plurality of adsorptive potassium ion particles are evenly attached on at least one side of the separation membrane to form an adsorptive potassium ion particle layer.

According to the present invention, a porous separation membrane has a plurality of through-holes, the size of which is smaller than the size of the potassium ions contained in an electrolyte, and a plurality of adsorptive potassium ion particles are evenly attached on a surface of the separation membrane to form an adsorptive potassium ion particle layer so that the potassium ions can be prevented at most from passing through the separation membrane and thus the potassium ions can be stably prevented from being moved to a positive electrode and being precipitated therefrom.

BRIEF DESCRIPTION OF THE DRAWINGS

FIG. 1 is a view of a structure of a zinc-air battery according to the present invention.

DETAILED DESCRIPTION

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

The terminology used herein is for the purpose of describing particular embodiments only and is not intended to be limiting to the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, and/or groups thereof but do not preclude the presence or addition of one or more other features, integers, steps, operations, elements, components, and/or groups thereof.

While such terms as "first," "second," etc., may be used to describe various components, such components must not be limited to the above terms. The above terms are used only to distinguish one component from another.

The present invention relates to a zinc-air secondary battery, and more particularly, to a zinc-air secondary battery including: a positive electrode; a negative electrode; a separation membrane interposed between the positive and negative electrodes; and an electrolyte accommodated between the positive and negative electrodes and submerging a part of the positive electrode, wherein the separation membrane, which is a porous separation membrane having a plurality of through-holes, is provided with through-holes, the size of which is smaller than the size of the potassium ions contained in the electrolyte, and a plurality of adsorptive potassium ion particles are evenly attached on at least one side of the separation membrane to form an adsorptive potassium ion particle layer.

In the present invention, the positive electrode includes an air diffusion layer, a carbon layer, and a positive electrode collector, as generally known, and preferably, the air diffusion layer may be formed of a hydrophobic layer material, such as polytetrafluoroethylene (PTFE), so as to extend a life-span of the zinc-air secondary battery by preventing moisture and carbon dioxide ($CO_2$) in the external air from being introduced into the zinc-air secondary battery, and the carbon layer causes the reaction of the following Formula 1 by reacting with introduced oxygen, and preferably, the positive electrode collector that collects electrons generated by the chemical reaction of the carbon layer may have a mesh structure formed of a conductive material, such as metal.

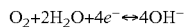
$$O_2+2H_2O+4e^-\leftrightarrow 4OH^-$$ [Formula 1]

In the present invention, the negative electrode includes a negative electrode collector, and the electrolyte is accommodated between the negative electrode collector that is the negative electrode and the separation membrane. The electrolyte has a shape of a slurry in which zinc (Zn), potassium hydroxide (KOH) and water ($H_2O$) are mixed altogether, and the electrolyte passes through the separation membrane and submerges a part of the carbon layer, thereby forming a vapor liquid interface. The negative electrode collector functions as a negative electrode when the electrolyte accommodated therein causes the reaction of the following Formula 2.

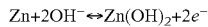
$$Zn+2OH^-\leftrightarrow Zn(OH)_2+2e^-$$

$$Zn+OH^-\leftrightarrow ZnO+H_2O+2e^-$$ [Formula 2]

In the present invention, the separation membrane is interposed between the positive electrode and the negative electrode so as to prevent a short circuit between the positive and negative electrodes and because the separation membrane needs to transmit hydroxyl ions generated in the carbon layer of the positive electrode through a chemical reaction with oxygen to the negative electrode, preferably, the separation membrane may be formed of material having ion permeability such as polypropylene.

In the present invention, the separation membrane that is a porous separation membrane having a plurality of through-holes, is provided with through-holes, the size of which is smaller than the size of the potassium ions contained in the electrolyte so that the potassium ions in the electrolyte can be stably prevented from being moved to the positive electrode, and a plurality of adsorptive potassium ion particles are evenly attached on at least one side of the separation membrane.

In the present invention, when the adsorptive potassium ion particles have an adsorption property with respect to the potassium ions, they are not specifically limited, and preferably, the adsorptive potassium ion particles may be one selected from the group consisting of alginate, chitosan, carboxymethyl cellulose, gelatin, polyacrylic acid, and a derivative thereof.

In addition, the adsorptive potassium ion particles may be characterized as bead-shaped resin, the surface of which is reformed to have polarity, and the resin is not specifically limited but may be, preferably, thermoplastic or thermosetting resin. The bead-shaped resin surface of the adsorptive potassium ion particles may be reformed to have polarity using various methods. However, in the present invention, a high-concentration ozone solution is in contact with the bead-shaped resin surface of the adsorptive potassium ion particles so that the bead-shaped resin surface may be reformed to have polarity, or ultraviolet (UV) rays are irradiated onto the bead-shaped resin surface of the adsorptive potassium ion particles so that the bead-shaped resin surface may be formed to have polarity.

In the present invention, a method of attaching the adsorptive potassium ion particles on the surface of the separation membrane is not specifically limited. However, preferably, a mixture of the adsorptive potassium ion particles and an organic binder may be sprayed onto the surface of the separation membrane using a spray method to form an adsorptive potassium ion particle layer so that the adsorptive potassium ion particles can be simply and evenly attached on the surface of the separation membrane.

In the zinc-air secondary battery according to the present invention, the size of the through-holes of the separation membrane is smaller than the size of the potassium ions and simultaneously, a plurality of adsorptive potassium ion particles are evenly attached on at least one side of the separation membrane so that the potassium ions in the electrolyte cannot pass through the separation membrane and thus the potassium ions can be stably prevented from being moved to the positive electrode and precipitated therefrom. Thus, destruction of the carbon layer due to precipitation of the potassium ions can be prevented, and as such, degradation of the performance of the zinc-air secondary battery can be minimized.

Hereinafter, for understanding of the present invention, an example illustrated in the drawings will be described. However, the example illustrated in the following drawings is just an example for explaining the present invention, and the scope of the invention is not limited thereby.

FIG. 1 is a view of a structure of a zinc-air secondary battery according to the present invention. Referring to FIG. 1, the zinc-air secondary battery according to the present invention includes a positive electrode, a separation membrane 40, an electrolyte 50, and a negative electrode collector 60.

First, the positive electrode includes a carbon layer 20, a positive electrode collector 30 having a shape of metal mesh formed in the carbon layer 20, and a Teflon layer 10 formed at an upper portion of the carbon layer 20.

The separation membrane 40 is placed at a lower portion of the carbon layer 20, and the negative electrode collector 60 that is the negative electrode is formed while being spaced a predetermined distance apart from the separation membrane 40.

The electrolyte 50 has a shape of a slurry in which zinc (Zn), potassium hydroxide (KOH) and water ($H_2O$) are mixed altogether, and is accommodated between the separation membrane 40 and the negative electrode collector 60 that is the negative electrode. In this case, the electrolyte 50 passes through the separation membrane 40 and submerges a part of the carbon layer 20, thereby forming a vapor liquid interface 21.

In the present invention, the separation membrane 40 that is a porous separation membrane having a plurality of through-holes, is provided with through-holes, the size of which is smaller than the size of the potassium ions contained in the electrolyte, and a plurality of adsorptive potassium ion particles are evenly attached on at least one side of the separation membrane 40 to form an adsorptive potassium ion particle layer 41. Thus, the potassium ions cannot pass through the separation membrane 40 and can be stably prevented from being moved to the positive electrode and being precipitated therefrom. As a result, destruction of the carbon layer 20 can be prevented due to precipitation of the potassium ions, and as such, degradation of the performance of the zinc-air secondary battery can be minimized.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A zinc-air secondary battery comprising:
a positive electrode;
a negative electrode;
a separation membrane interposed between the positive and negative electrodes; and
an electrolyte configured to submerge the negative electrode, the separation membrane, and a part of the positive electrode,
wherein the separation membrane, which is a porous separation membrane having a plurality of through-holes, is provided with through-holes, the size of which is smaller than the size of the potassium ions contained in the electrolyte, and a plurality of adsorptive potassium ion particles are evenly attached on at least one side of the separation membrane to form an adsorptive potassium ion particle layer.

2. The zinc-air secondary battery of claim 1, wherein the adsorptive potassium ion particles are one selected from the group consisting of alginate, chitosan, carboxymethyl cellulose, gelatin, and a derivative thereof.

3. The zinc-air secondary battery of claim 1, wherein the adsorptive potassium ion particles are bead-shaped resin, the surface of which is reformed to have polarity.

4. The zinc-air secondary battery of claim 3, wherein the resin is thermoplastic or thermosetting resin.

5. The zinc-air secondary battery of claim 3, wherein the adsorptive potassium ion particles have a bead-shaped resin surface that is in contact with a high-concentration ozone solution and is reformed to have polarity.

6. The zinc-air secondary battery of claim 3, wherein the adsorptive potassium ion particles have a bead-shaped resin surface onto which ultraviolet (UV) rays are irradiated and which are reformed to have polarity.

* * * * *